(12) United States Patent
Fei

(10) Patent No.: US 10,218,557 B2
(45) Date of Patent: Feb. 26, 2019

(54) PHASE AMBIGUITY PROCESSING METHOD AND DEVICE FOR QUADRATURE AMPLITUDE MODULATION SIGNAL

(71) Applicant: ZTE CORPORATION, Shenzhen, Guangdong (CN)

(72) Inventor: Aimei Fei, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 15/574,457

(22) PCT Filed: Mar. 14, 2016

(86) PCT No.: PCT/CN2016/076281
§ 371 (c)(1),
(2) Date: Nov. 15, 2017

(87) PCT Pub. No.: WO2016/184235
PCT Pub. Date: Nov. 24, 2016

(65) Prior Publication Data
US 2018/0145865 A1 May 24, 2018

(30) Foreign Application Priority Data
May 15, 2015 (CN) .......................... 2015 1 0247479

(51) Int. Cl.
*H03M 13/09* (2006.01)
*H04L 27/34* (2006.01)
(Continued)

(52) U.S. Cl.
CPC ........ *H04L 27/3455* (2013.01); *H04J 14/002* (2013.01); *H04J 14/06* (2013.01); *H04L 27/38* (2013.01); *H04L 27/3827* (2013.01)

(58) Field of Classification Search
CPC ................................. H04L 1/004; H04L 7/048
(Continued)

(56) References Cited

U.S. PATENT DOCUMENTS 5,400,348 A * 3/1995 Yang ..................... H03M 13/01
714/775
6,108,374 A * 8/2000 Balachandran ....... H04L 1/0009
375/227
(Continued)

FOREIGN PATENT DOCUMENTS

CN 102571682 A 7/2012
CN 103051384 A 4/2013
(Continued)

OTHER PUBLICATIONS

International Search Report dated Jun. 6, 2016 for International Application No. PCT/CN2016/076281, 5 pages.
(Continued)

*Primary Examiner* — James M Perez
(74) *Attorney, Agent, or Firm* — Knobbe, Martens, Olson & Bear, LLP

(57) ABSTRACT

A phase ambiguity processing method and device are provided. The phase ambiguity processing method includes: deciding symbols on a Y polarization state and an X polarization state of a received signal, and mapping to obtain first bit information, where the received signal includes a plurality of first signals; checking and analyzing the first bit information to generate a first check result; judging the first check result to obtain a judgment result as to whether the received signal has phase ambiguity; acquiring at least one of the plurality of first signals in the received signal when the judgment result indicates that the received signal has phase ambiguity; performing phase rotation on the first signal to obtain a second signal; and checking and analyzing the second signal, storing the second signal so that the first signal is replaced with the second signal for decoding processing if a check result is normal.

20 Claims, 10 Drawing Sheets

(51) Int. Cl.
*H04L 27/38* (2006.01)
*H04J 14/00* (2006.01)
*H04J 14/06* (2006.01)
*H03M 13/11* (2006.01)

(58) Field of Classification Search
USPC ............ 375/259–285, 316–351, 354–376
See application file for complete search history.

(56) References Cited

U.S. PATENT DOCUMENTS

| | | | | |
|---|---|---|---|---|
| 6,215,827 | B1* | 4/2001 | Balachandran | H04L 1/0003 375/262 |
| 7,627,058 | B2* | 12/2009 | Poberezhskiy | H03C 3/40 375/308 |
| 7,680,211 | B1* | 3/2010 | von der Embse | H04L 1/0071 375/130 |
| 7,992,070 | B2* | 8/2011 | Djordjevic | H03M 13/11 375/260 |
| 9,083,470 | B2* | 7/2015 | Takashima | H04B 10/69 |
| 9,225,455 | B2* | 12/2015 | Yu | H04J 14/02 |
| 9,264,144 | B2* | 2/2016 | Yu | H04L 27/18 |
| 9,336,079 | B2* | 5/2016 | Zhang | G06F 11/10 |
| 9,564,976 | B2* | 2/2017 | Yu | H04B 10/6164 |
| 9,673,907 | B1* | 6/2017 | Vassilieva | H04B 10/5161 |
| 9,692,548 | B2* | 6/2017 | Jia | H04B 10/6165 |
| 9,698,914 | B2* | 7/2017 | Yu | H04L 25/0305 |
| 9,912,414 | B2* | 3/2018 | Jia | H04B 10/6165 |
| 9,941,974 | B2* | 4/2018 | Yu | H04B 10/612 |
| 10,148,363 | B2* | 12/2018 | Chien | H04B 10/6162 |
| 2006/0140299 | A1* | 6/2006 | Jin | H04L 27/3433 375/261 |
| 2007/0223602 | A1* | 9/2007 | Yu | H03M 13/11 375/260 |
| 2009/0041151 | A1* | 2/2009 | Khan | H04L 5/0023 375/267 |
| 2010/0050048 | A1* | 2/2010 | Djordjevic | H03M 13/1117 714/755 |
| 2010/0138722 | A1* | 6/2010 | Harley | H03M 13/333 714/762 |
| 2010/0201398 | A1* | 8/2010 | Zhao | H04L 1/0041 326/52 |
| 2011/0033184 | A1* | 2/2011 | Zhang | H04J 14/002 398/65 |
| 2011/0150505 | A1* | 6/2011 | Roberts | H04B 10/60 398/208 |
| 2014/0010543 | A1* | 1/2014 | Lee | H04B 10/61 398/79 |
| 2014/0099108 | A1* | 4/2014 | Yu | H04B 10/64 398/48 |
| 2014/0211838 | A1* | 7/2014 | Yu | H04L 27/3818 375/233 |
| 2014/0233966 | A1* | 8/2014 | Yu | H04B 10/613 398/208 |
| 2014/0341236 | A1* | 11/2014 | Yu | H04J 14/06 370/499 |
| 2015/0160997 | A1* | 6/2015 | Zhang | G06F 11/10 714/758 |
| 2015/0171895 | A1* | 6/2015 | Pfau | G06F 11/10 714/776 |
| 2015/0280834 | A1* | 10/2015 | Sun | H04B 10/6164 398/79 |
| 2016/0127166 | A1* | 5/2016 | Zhang | H04L 27/367 398/185 |
| 2016/0211939 | A1* | 7/2016 | Yu | H04L 27/34 |
| 2017/0134120 | A1* | 5/2017 | Calabro | H04B 10/548 |
| 2018/0026687 | A1* | 1/2018 | Rahman | H04B 7/0469 375/267 |
| 2018/0102851 | A1* | 4/2018 | Zhang | H04B 10/532 |
| 2018/0183542 | A1* | 6/2018 | Yoshida | H04B 10/516 |
| 2018/0219632 | A1* | 8/2018 | Yoshida | H04B 10/29 |

FOREIGN PATENT DOCUMENTS

CN 103124208 A 5/2013
RU 2012104932 A 10/2013

OTHER PUBLICATIONS

Cao Guoliang et al., "Assessment of Extended Kalman Filtering Based Simultaneous Polarization and Phase Tracking PDM-16QAM," Acta Optica Sinica. Dec. 31, 2014.

* cited by examiner (a) Gray mapping of 16QAM (b) 128-SP-QAM, X-axis (c) 128-SP-QAM, Y-axis

PHASE AMBIGUITY PROCESSING METHOD AND DEVICE FOR QUADRATURE AMPLITUDE MODULATION SIGNAL

CROSS REFERENCE TO RELATED APPLICATIONS

This application is the U.S. National Phase Application under 35 U.S.C. § 371 of International Application No. PCT/CN2016/076281, filed Mar. 14, 2016, designating the U.S. and published as WO 2016/184235 A1 on Nov. 24, 2016 which claims the benefit of Chinese Patent Application No. 201510247479.3, filed May 15, 2015, both of which are hereby incorporated by reference in their entirety.

TECHNICAL FIELD

The present disclosure relates, but is not limited, to the field of optical communication technology, and in particular relate to a phase ambiguity processing method and device for a quadrature amplitude modulation signal.

BACKGROUND

In high-speed communication systems, there exists a problem of phase ambiguity during phase modulation. Current solutions include the following two methods. One is a training sequence method applied to an absolute phase detection system, that is, a phase ambiguity angle is detected through the training sequence of a known phase, and then a proximity signal is corrected accordingly. Such method can well solve the problem of phase ambiguity, but increases the system overhead. The other method employs a phase differential modulation to correct the problem of phase ambiguity, but a performance is reduced compared with training sequence method.

In four-dimensional modulation format, such as Set-partitioning Quadrature Amplitude Modulation (SP-QAM), divided based on Polarization Multiplexed M-state Quadrature Amplitude Modulation (PM-MQAM), the QAM is a quadrature amplitude modulation such as 32-SP-QAM and 128-SP-QAM. In such pattern, N bits which make up the signal are divided into two subsets. One subset makes up the SP-QAM signal n, and the other is a checking bit. In this way, each symbol of the SP-QAM signal carries n bits valid information, a minimum Euclid distance is increased compared to PM-MQAM. Taking 128-SP-QAM for example, there are 8 bits in total including 7 bits information. As shown in FIG. 1, d1 to d7 are the valid information. FIG. 2, FIG. 3 and FIG. 4 show that this method achieves an association of an X polarization state and a Y polarization state. For example, when the valid information is 1101 011, and the last bit can only be 0 or 1 according to odd parity or even parity. For example, the last bit can be 1 if the even parity is employed.

A decision algorithm at a reception terminal generally includes the following steps.

In step 1, symbols on the Y polarization state and the X polarization state are decided, bit information is obtained by mapping, and the bit information is checked and analyzed. Data that meets the check is reserved.

In step 2, symbols X and Y which fail to meet the check are re-decided in a next-nearest decision domain, meanwhile, a distance between an original symbol and the decision point is recorded, and data with shorter renewal and shorter distance of X and Y are compared.

In step 3, error is compared.

Before the error comparison, it is necessary to carry out the phase ambiguity problem. If the method based on training sequence is completed before the check decoding in the SP-QAM system, a parity misjudgment caused by phase ambiguity can be avoided. However, a disadvantage of this method is the training sequence increases the system overhead.

For SP-QAM system using differential phase, if the differential decoding is completed before the parity correction of the SP-QAM, the parity misjudgment caused by phase ambiguity in the system can also be avoided. However, the system performance is reduced. if the differential decoding is after the parity correction, the parity misjudgment caused by the phase ambiguity leads to large consecutive errors.

SUMMARY

The following is a summary of the topics described in detail in this disclosure. This summary is not intended to limit the scope of the claims.

Embodiments of the present disclosure provide a phase ambiguity processing method and device for a quadrature amplitude modulation signal, which can effectively reduce an error rate of differential decoding of the QAM signal, reduce the system overhead and improve system performance, during a phase ambiguity correction of the quadrature amplitude modulation signal.

An embodiment of the present disclosure provides a phase ambiguity processing method for a quadrature amplitude modulation signal, including:

deciding symbols on a Y polarization state and an X polarization state of a received signal, and mapping to obtain first bit information, wherein the received signal comprises a plurality of first signals;

checking and analyzing the first bit information to generate a first check result;

judging the first check result to obtain a judgment result as to whether the received signal has phase ambiguity;

acquiring at least one of the plurality of first signals in the received signal when the judgment result indicates that the received signal has phase ambiguity;

performing phase rotation on the first signal to obtain a second signal; and checking and analyzing the second signal, storing the second signal so that the first signal is replaced with the second signal for decoding processing if a check result is normal.

Optionally, the step of checking and analyzing the first bit information to generate the first check result includes:

acquiring signal bits and a check bit in the first bit information corresponding to each of the plurality of first signals;

performing an exclusive-OR process to the signal bits to obtain a first process result; and comparing the first process result with the check bit to obtain a comparison result, wherein it is indicated that the comparison result of the first signal is normal when the first process result is consistent with the check bit; and it is indicated that the comparison result of the first signal is abnormal when the first process result is not consistent with the check bit, and comparison results of the plurality of first signals together constitute the first check result.

Optionally, the step of judging the first check result to obtain a judgment result as to whether the received signal has phase ambiguity includes:

analyzing a state of each first signal in the first check result and determining whether the first signal is in a check exception state, wherein, it is indicated that the received signal has phase ambiguity if a number of first signals, to which consecutive check exception occurred, in the first check result exceeds a first predetermined value;

the step of acquiring at least one of the plurality of first signals in the received signal when the judgment result indicates that the received signal has phase ambiguity comprises:

acquiring an initial one of the first signals, to which consecutive check exception occurred, and all first signals after the initial first signal when the judgment result indicates that the received signal has phase ambiguity.

Optionally, the step of judging the first check result to obtain a judgment result as to whether the received signal has phase ambiguity includes:

analyzing a state of each first signal in the first check result to determine whether the first signal is in a check exception state;

wherein it is indicated that the received signal has phase ambiguity if a total number of first signals which are in the check exception state in the first check result exceeds a second predetermined value;

the step of acquiring at least one of the plurality of first signals in the received signal when the judgment result indicates that the received signal has phase ambiguity comprises:

acquiring all first signals in the received signal when the judgment result indicates that the received signal has phase ambiguity.

Optionally, the step of performing phase rotation on the first signal to obtain a second signal includes:

performing phase rotation on symbols on the X polarization state or the Y polarization state of the first signal to obtain the second signal, wherein, a phase change is $\pi/2$ or $-\pi/2$ by comparing the second signal with the first signal.

Optionally, the step of checking and analyzing the second signal, storing the second signal so that the first signal is replaced with the second signal for decoding processing if a check result is normal includes:

deciding symbols in the second signal, and mapping to obtain second bit information;

checking and analyzing the second bit information to generate a second check result; and storing the second signal so that the first signal is replaced with the second signal for decoding process, when the second check result indicates that no exception occurred in checking of the second signal.

Optionally, the phase ambiguity processing method further includes:

re-deciding the second signal by a next-nearest distance to obtain a third signal when the second check result indicates that an exception occurred in checking of the second signal, and storing the third signal so that the second signal is replaced with the third signal for decoding process.

Optionally, the phase ambiguity processing method further includes:

storing the first signals with no check exception in the received signal and using the first signals with no check exception in the received signal in decoding process, when the judgement result indicates that the received signal has no phase ambiguity; and re-deciding the first signals with check exception in the received signal by a next-nearest distance to obtain a fourth signal, storing the fourth signal so that the first signal is replaced with the fourth signal for decoding process.

An embodiment of the present disclosure provides a phase ambiguity processing device for a quadrature amplitude modulation signal, including:

a decision module, configured to decide symbols on a Y polarization state and an X polarization state of a received signal, and map to obtain first bit information, wherein the received signal comprises a plurality of first signals;

a first check module, configured to check and analyze the first bit information to generate a first check result;

a check result judging module, configured to judge the first check result to obtain a judgment result as to whether the received signal has phase ambiguity;

a first acquisition module, configured to acquire at least one of the plurality of first signals in the received signal when the judgment result indicates that the received signal has phase ambiguity;

a phase rotation module, configured to perform phase rotation on the first signal to obtain a second signal; and a second check module, configured to check and analyze the second signal, store the second signal so that the first signal is replaced with the second signal for decoding processing if a check result is normal.

Optionally, the check result judging module is configured to:

analyze a state of each first signal in the first check result to determine whether the first signal is in a check exception state;

wherein it is indicated that the received signal has phase ambiguity if the number of first signals, to which consecutive check exception occurred, in the first check result exceeds a first predetermined value;

the first acquisition module is configured to:

acquire an initial one of first signals, to which consecutive check exception occurred, and all the first signals after the initial one of the first signals when the judgement result indicates that the received signal has phase ambiguity.

Optionally, the check result judging module is configured to:

analyze a state of each first signal in the first check result to determine whether the first signal is in a check exception state;

wherein it is indicated that the received signal has phase ambiguity if a total number of first signals which are in the check exception state in the first check result exceeds a second predetermined value;

the first acquisition module is configured to:

acquire all the first signals in the received signal when the judgement result indicates that the received signal has phase ambiguity.

Optionally, the phase rotation module is configured to:

perform phase rotation on symbols on the X polarization state or the Y polarization state of the first signal to obtain the second signal, wherein a phase change is $\pi/2$ or $-\pi/2$ by comparing the second signal with the first signal.

Optionally, the second check module includes:

a decision unit, configured to decide symbols in the second signal, and map to obtain second bit information;

a checking unit, configured to check and analyze the second bit information to generate a second check result; and a storage unit, configured to store the second signal so that the first signal is replaced with the second signal for decoding process, when the second check result indicates that no exception occurred in checking of the second signal.

An embodiment of the present disclosure further provides a computer storage medium storing computer-executable instructions for implementing the above method.

Benefits of embodiments of the present disclosure are:

According to the above solution, by checking and judging the quadrature amplitude modulation QAM signal, the QAM signal is corrected by phase rotation, when it is found that a check error of the QAM signal is induced by phase ambiguity. Such manner effectively reduces the error rate of the differential decoding of the QAM signal. Meanwhile, such manner further reduces the system overhead and improves the system performance.

Other aspects of the disclosure will be understood after reading and understanding the accompanying drawings and detailed description.

DETAILED DESCRIPTION

The disclosure will be described in detail below with reference to the accompanying drawings and specific embodiments.

Figure 5:
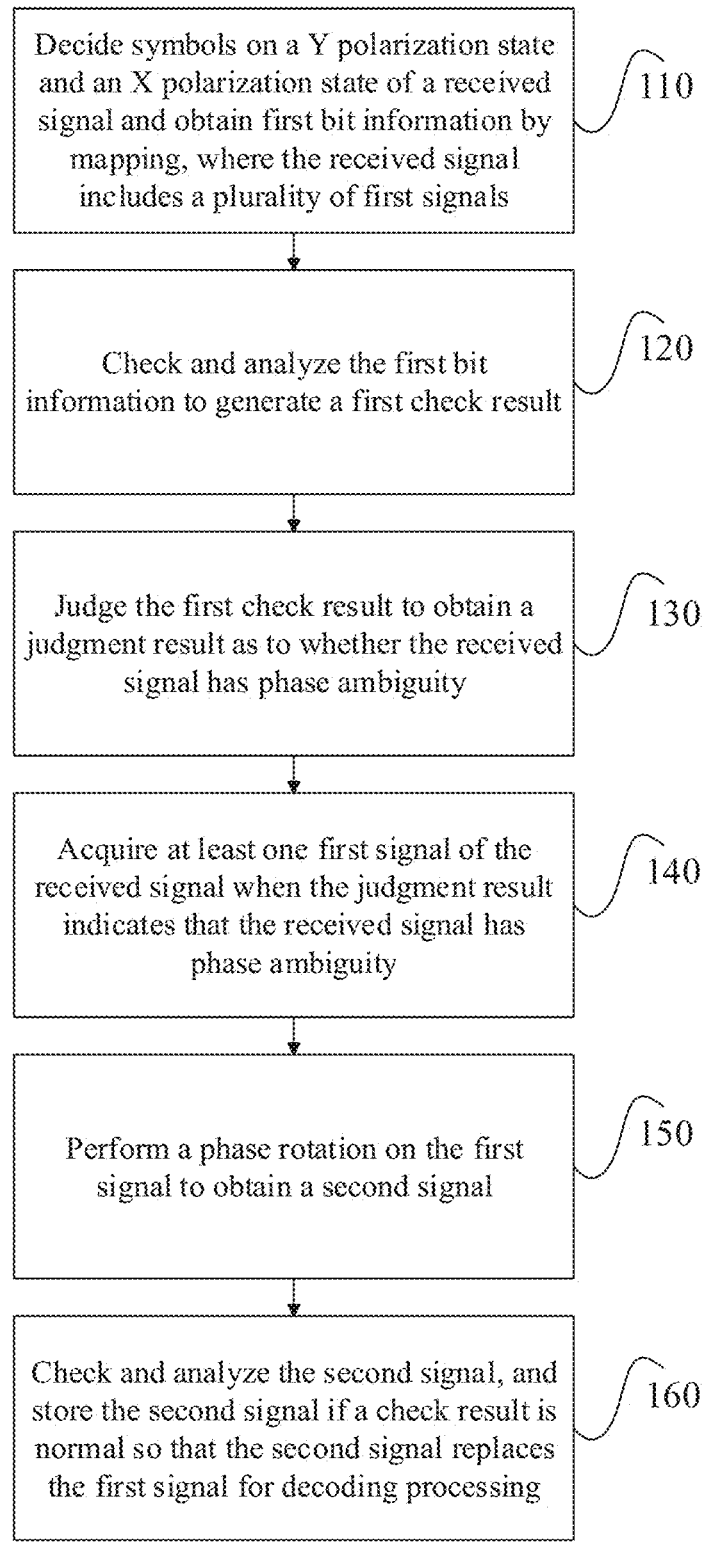
FIG. 5 is an overall flowchart illustrating the phase ambiguity processing method of an embodiment of the present disclosure.

Embodiments of present disclosure are directed to problems that, when a phase ambiguity correction is performed on an associated quadrature amplitude modulation signal, the system overhead is increased, the power consumption is large and saving cost is not benefited. As shown in FIG. 5, an embodiment of the present disclosure provides a phase ambiguity processing method for a quadrature amplitude modulation signal including following steps.

In step 110, symbols on a Y polarization state and an X polarization state of a received signal are decided, and first bit information is obtained by mapping, where the received signal includes a plurality of first signals.

In step 120, the first bit information is checked and analyzed so as to generate a first check result.

In step 130, the first check result is judged to obtain a judgment result as to whether the received signal has phase ambiguity.

In step 140, at least one of first signals in the received signal is acquired when the judgment result indicates that the received signal has phase ambiguity.

In step 150, phase rotation is performed on the first signal to obtain a second signal.

In step 160, the second signal is checked and analyzed. If a check result is normal, the second signal is stored so that the first signal is replaced with the second signal for decoding processing.

According to the above technical solution, when it is determined by checking the quadrature amplitude modulation QAM signal that the check error of the QAM signal is induced by phase ambiguity, the QAM signal is corrected through a phase rotation manner. Such manner effectively reduces the error rate of differential decoding of the QAM signal. Meanwhile, such manner reduces the system overhead and increases the system performance.

Figure 6:
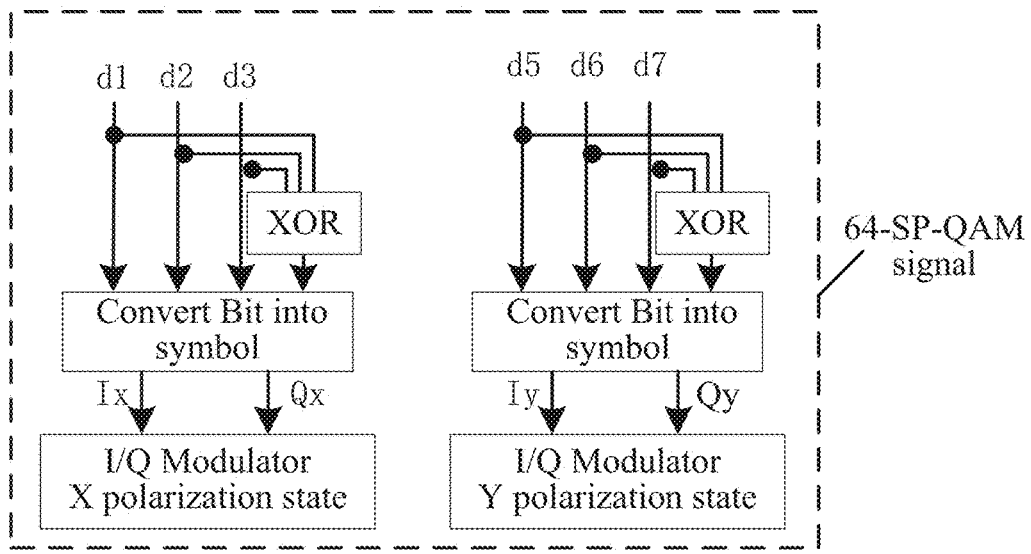
FIG. 6 is a schematic diagram illustrating a generation process of a 64-SP-QAM signal.
Figure 7:
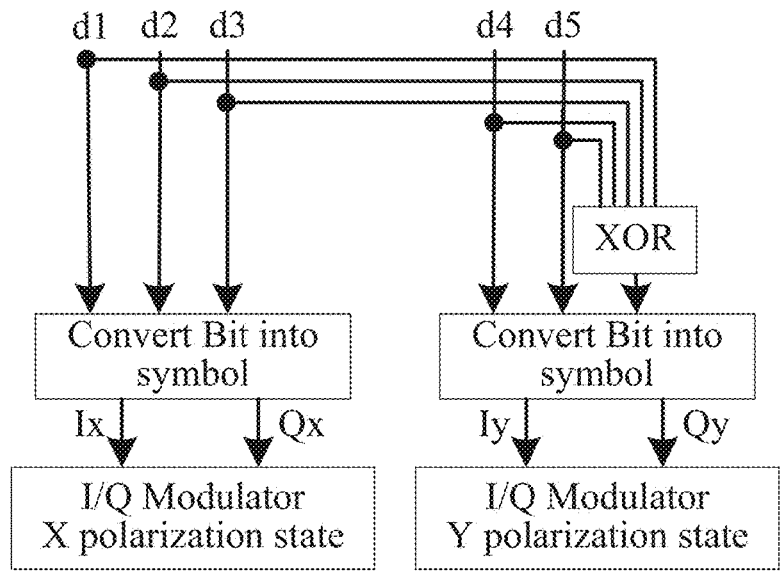
FIG. 7 is a schematic diagram illustrating a generation process of a 32-SP-QAM signal (generated based on PM-8QAM)

It should be noted that the formations of different QAM signals are different. For example, a generation process of a 64-SP-QAM signal is shown in FIG. 6, symbols of the X polarization state are composed of valid information d1 to d3 and exclusive-OR information of d1 to d3, and symbols of Y polarization state are composed of valid information d5 to d7 and exclusive-OR information of d5 to d7. The generation process of a 32-SP-QAM signal (generated based on PM-8QAM) is shown in FIG. 7, symbols of the X polarization state are composed of valid information d1 to d3 and exclusive-OR information of d1 to d3, and symbols of Y polarization state are composed of valid information d5 to d6, exclusive-OR information of d5 to d6 and exclusive-OR information of the four following information: valid information d1 to d3, valid information d5 to d6, exclusive-OR information of d1 to d3 and exclusive-OR information of d5 to d6.

When a reception terminal of the QAM signal receives the QAM signal, the reception terminal also acquires the generation manner of the QAM signal. With respect to different generation manners of the QAM signal, the reception terminal adopts corresponding symbol decision manners. It should be noted that the manner of obtaining the bit information from the received signal in step 110 is well known to those skilled in the art and is described in detail herein.

Figure 9:
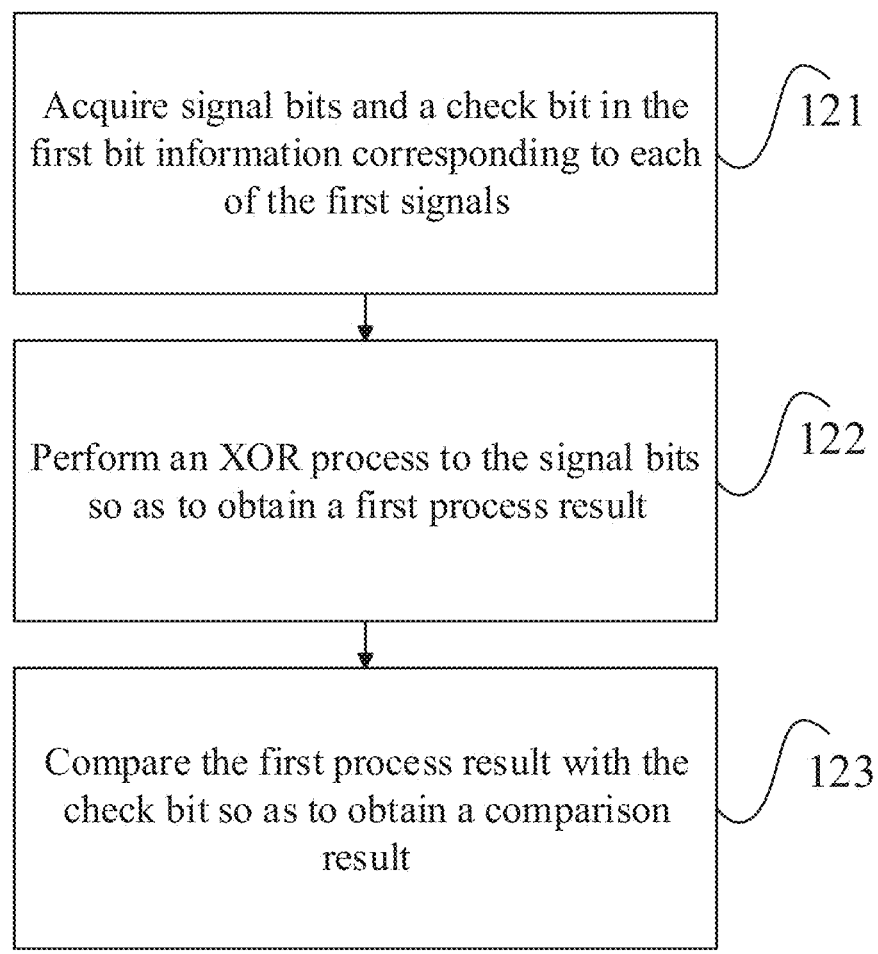
FIG. 9 is a detailed flowchart of the step 120 of an embodiment of the present disclosure.

In an embodiment of the present disclosure, as shown in FIG. 9, an implementation of the step 120 includes steps 121 to 123.

In step 121, signal bits and a check bit in the first bit information corresponding to each of the plurality of first signals are acquired.

In step 122, an exclusive-OR process is performed to the signal bits so as to obtain a first process result.

In step 123, the first process result is compared with the check bit so as to obtain a comparison result, including:

When the first process result is consistent with the check bit, it is indicated that the comparison result of the first signal is normal; when the first process result is not consistent with the check bit, it is indicated that the comparison result of the first signal is abnormal.

Comparison results of the plurality of first signals together constitute the first check result.

Figure 1:
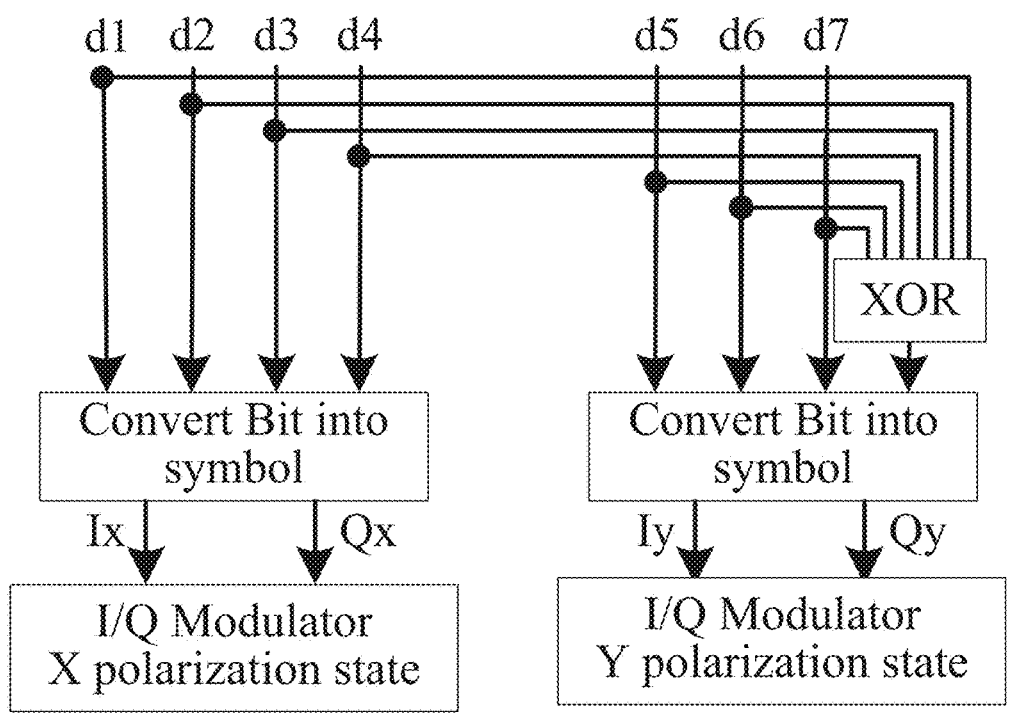
FIG. 1 is a schematic diagram illustrating a generation process of a 128-SP-QAM signal.
Figure 2:
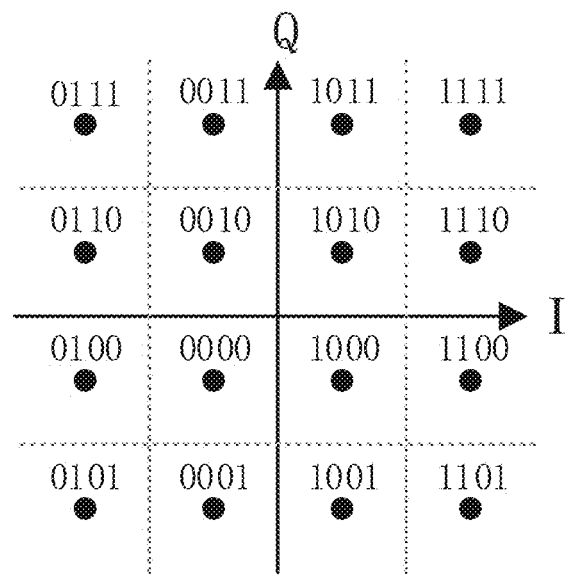
FIG. 2 is a schematic diagram illustrating a Gray mapping of a 16 AQM signal.
Figure 8:
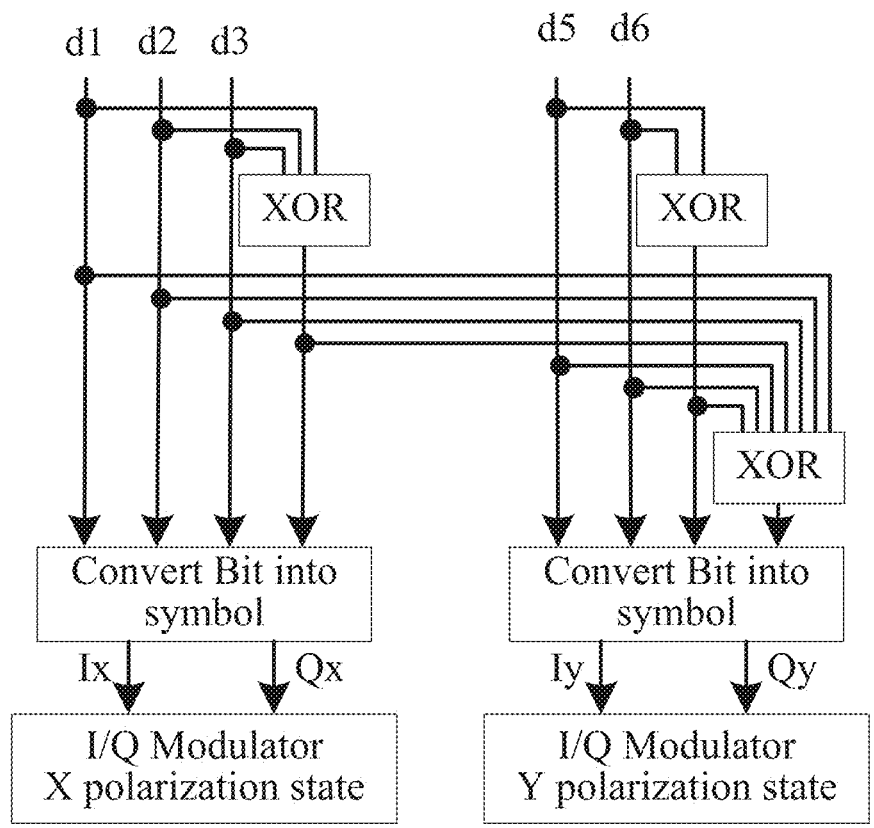
FIG. 8 is a schematic diagram illustrating a generation process of a 32-SP-QAM signal (generated based on PM-16QAM)

It should be noted that, in step 120, each first signal (i.e. QAM signal) of the received signal is checked separately (odd parity or even parity). It should be noted that the check manner employed during the parity corresponds to the generation manner of the QAM signal. When the received signal is the 128-SP-QAM signal shown in FIG. 1 or the 32-SP-QAM signal generated based on PM-8QAM shown in FIG. 7, it is necessary to integrally check bit information on the X polarization state and the Y polarization state of the QAM signal to obtain the check result, and the check results are stored one by one according to a reception order of the QAM signals for subsequent use. When the received signal is the 64-SP-QAM signal shown in FIG. 6, or the 32-SP-QAM signal generated based on PM-16 QAm shown in FIG. 8, it is necessary to check the bit information on the X polarization state and the bit information on the Y polarization state of each QAM signal separately, and then the check results of the X polarization state are stored one by one according to a reception order of the QAM signals for subsequent use and the check results of the Y polarization state are stored one by one according to a reception order of the QAM signals for subsequent use.

After the check results are obtained, it is necessary to analyze the check results and determine whether the check error is caused by phase ambiguity. Therefore, a first implementation of the step 130 in the embodiment of the present disclosure includes the steps below.

A state of each first signal in the first check result is analyzed to determine whether the first signal is in a check exception state.

It is indicated that the received signal has phase ambiguity if the number of first signals, to which consecutive check exception occurred, in the first check result exceeds a first predetermined value.

With respect to the first implementation, an implementation of step 140 includes: when the judgment result indicates that the received signal has phase ambiguity, an initial one of the first signals, to which consecutive check exception occurred, and all the first signals after the initial one of the first signals are acquired.

A second implementation of step 130 in an embodiment of the disclosure includes:

The state of each first signal in the first check result is analyzed to determine whether the first signal is in the check exception state.

If the total number of first signals which are in the check exception state in the first check result exceeds a second predetermined value, it is indicated that the received signal has phase ambiguity.

With respect to the second implementation, another implementation of step 140 includes: when the judgment result indicates that the received signal has phase ambiguity, all the first signals in the received signal are acquired.

It should be noted that both of the above two implementations can be used to judge the phase ambiguity, the specification selection of the implementations depends on the actual application conditions.

When the received signal has phase ambiguity, it is necessary to correct the received signal. After acquiring the QAM signal that needs to be corrected, a specific implementation of step 150 includes the following steps.

Phase rotation is carried out on symbols on the Y polarization state of the X polarization state of the first signal to obtain the second signal.

A phase change is $\pi/2$ or $-\pi/2$ by comparing the second signal with the first signal.

It should be noted that, with respect to different QAM signal generation manners, different correction manners are adopted. When the received signal is the 128-SP-QAM signal shown in FIG. 1 or the 32-SP-QAM signal generated based on PM-8QAM shown in FIG. 7, a forward rotation by 90 degrees or a reverse rotation by 90 degrees are performed on the signal of the X polarization state or the Y polarization state of the QAM signal, if the phase ambiguity exists. When the received signal is the 64-SP-QAM signal shown in FIG. 6 or the 32-SP-QAM signal generated based on PM-16QAM, if the phase ambiguity exists, it is necessary to know which phase is specifically ambiguity. If the phase ambiguity occurs in the X polarization state, it is necessary to rotate, forwardly by 90 degrees or reversely by 90 degrees, phases of symbols on the X polarization state of the QAM signal. If the phase ambiguity occurs in both of the X polarization state and the Y polarization state of the QAM signal, it is necessary to rotate, forwardly by 90 degrees or reversely by 90 degrees, phases of symbols on the X polarization state and phases of symbols on the X polarization of the QAM signal respectively.

After the phase rotation, it is necessary to analyze the second signal so as to determine whether the second signal obtained after the phase rotation of the first signal is correct. Therefore, in another embodiment of the present disclosure, the step 160 includes the following steps.

Symbols in the second signal are decided, and second bit information is obtained by mapping.

The second bit information is checked and analyzed to generate a second check result.

When the second check result indicates that no exception occurred in checking of the second signal, the second signal is stored and the first signal is replaced with the second signal for decoding processing.

It should be noted that the second signal generated by phase rotation is checked and analyzed, this checking and analyzing process is the same as the checking and analyzing process of the first signal, and is not described in detail herein. If the checking and analyzing of the second signal is normal, it proves that the first signal corresponding to the second signal goes back to a normal signal after the phase rotation, and the second signal is the signal needed by decoding and is stored for subsequent decoding process. If the checking and analyzing of the second signal is abnormal, it proves that the first signal corresponding to the second signal does not go back to a normal signal after the phase rotation, so it is necessary to analyze the second signal again. Therefore, in another embodiment of the present disclosure, the phase ambiguity processing method further includes the following steps.

When the second check result indicates that an exception occurred in checking of the second signal, the second signal is re-decided by a next-nearest distance to obtain a third signal, the third signal is stored, and the second signal is replaced with the third signal for decoding process.

It should be noted that when the second signal is checked and analyzed to be abnormal, it is believed that the abnormal checking of the second signal is caused by the shift of signal in this phase, and it is necessary to re-decide the second signal by a next-nearest distance to find the third signal more closer to the second signal, and the third signal is stored. The third signal is a normal received signal after the first signal is phase ambiguity processed. It should be noted that the next-nearest re-decision manner is well known to those skilled in the art and is not described herein.

It should be noted that when determining whether the received signal has phase ambiguity, if it is determined that the received signal does not have phase ambiguity, it does not mean all the QAM signals in the received signal are at the normal state. Therefore, in another embodiment of the present disclosure, the phase ambiguity processing method further includes:

When the judgement result indicates that the received signal does not have phase ambiguity, the first signal with no check exception in the received signal is stored and the first signal with no check exception in the received signal is used for decoding process.

The first signal with check exception in the received signal is re-decided by a next-nearest distance to obtain a fourth signal, and the fourth signal is stored, such that the first signal is replaced with the fourth signal for decoding process.

It should be noted that the QAM signals with no check exception in the received signal that does not have phase ambiguity are directly stored, the QAM signals with check exception are re-decided by the next-nearest distance to obtain decided QAM signals, and the decided QAM signals are stored and serve as bases for decoding process.

An embodiment of the present disclosure further provides a computer storage medium. The computer storage medium stores computer-executable instructions for carrying out the above method.

Figure 10:
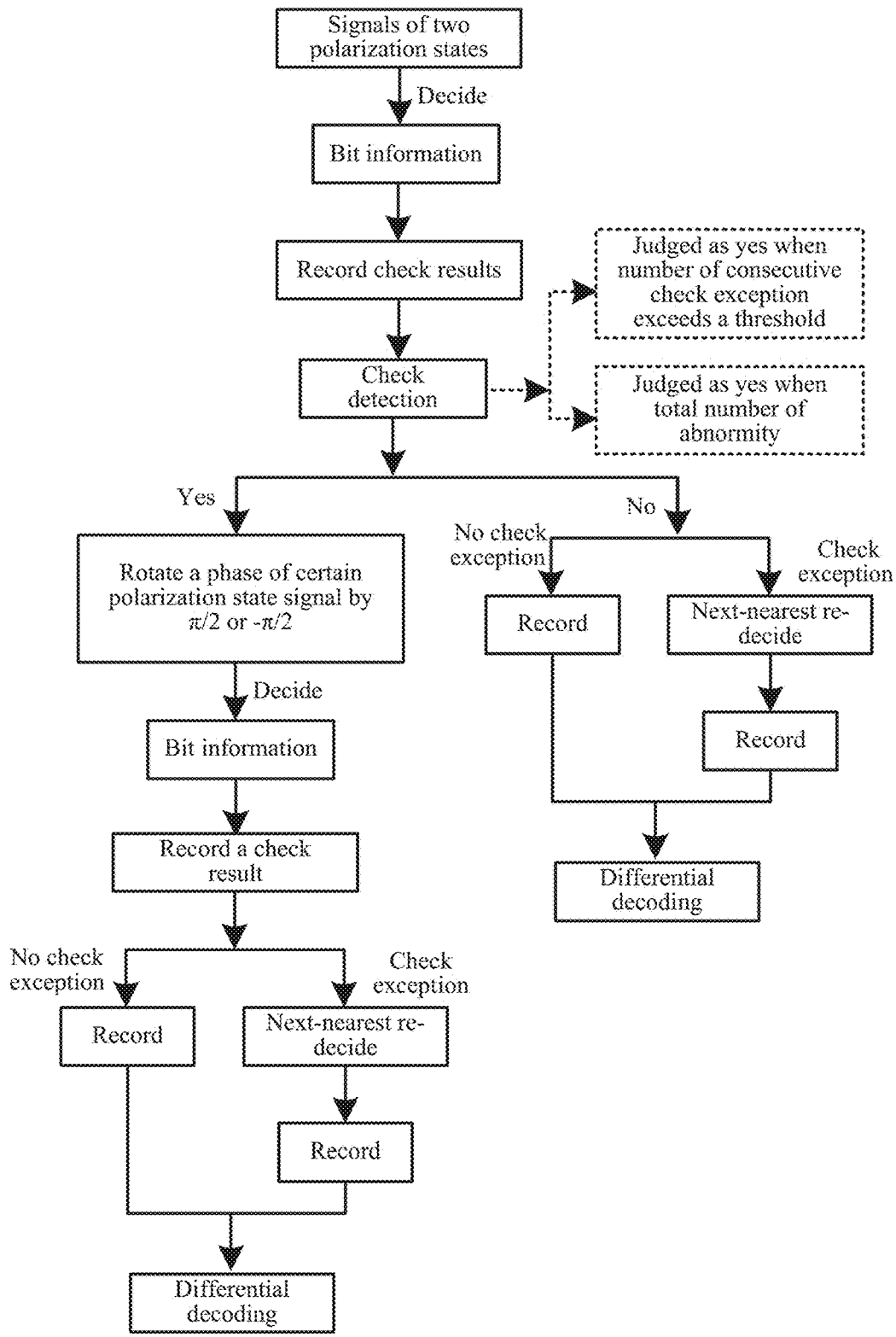
FIG. 10 is a detailed flowchart of the phase ambiguity processing method of an embodiment of the present disclosure.

As shown in FIG. 10, a detailed implementation flow of the above process in embodiments of the present disclosure includes steps 1 to 7.

In step 1, symbols on an X polarization state and a Y polarization state of each received QAM signal are decided, and bit information is obtained by mapping.

In step 2, the obtained bit information of each QAM signal is checked and analyzed. Step 2 includes: an exclusive-OR process is carried out on bits having a signal, a process result is compared with a check bit, the checking is normal if the comparison is consistent and the checking is abnormal if the comparison is not consistent, and the checking and analyzing results are recorded one by one according to a signal reception order.

In step 3, the recorded checking and analyzing results are judged to determine whether the received QAM signal has phase ambiguity. The judgement method can be classified in to two manners. A first manner: it is determined whether the number of first signals, to which consecutive check exception occurred, in the checking and analyzing result exceeds a threshold; if the number of first signals, to which consecutive check exception occurred, exceeds the threshold, it is believed that the phase ambiguity occurs; if the number of first signals, to which consecutive check exception occurred, does not exceed the threshold, it is believed that the phase ambiguity does not occur. A second manner, it is determined whether the total number of all the abnormal first signals in the checking and analyzing result exceeds a threshold, if the total number of all the abnormal first signals exceeds the threshold, it is believed that the phase ambiguity occurs; if the total number of all the abnormal first signals does not exceed the threshold, it is believed that the phase ambiguity does not occur.

In step 4, when the judgement result in step 3 is yes, it is necessary to perform the phase rotation process to the QAM signals. In embodiments of the present disclosure, with respect to different checking and analyzing manners, different phase rotation manners are used. With respect to the first manner in step 3, the phase rotation processing manner is: a phase of the initial abnormal signal, from which consecutive check exception occurred, and phases of all the signals after the initial abnormal signal in the polarization state are rotated by $\pi/2$ or $-\pi/2$ (that is rotated forwardly by 90 degrees or rotated reversely by 90 degrees). With respect to the second manner in step 3, the phase rotation processing manner is: phases of all the QAM signals on the abnormal polarization state are rotated by $\pi/2$ or $-\pi/2$.

In step 5, the QAM signals whose phases are rotated are re-decided, checked and analyzed, check results are recorded, bit information of signals with no check exception are saved. QAM signals with check exception are re-decided by a next-nearest distance and the bit information after the re-decision by the next-nearest distance is stored.

In step 6, when the judgement result in step 3 is no, no process is performed to phases of the QAM signals, bit information with no check exception is saved, the QAM signals with check exception are re-decided by a next-nearest distance and the bit information after the re-decision by the next-nearest distance is stored.

In step 7, the recorded bit results are subjected to a differential decoding process.

Figure 3:
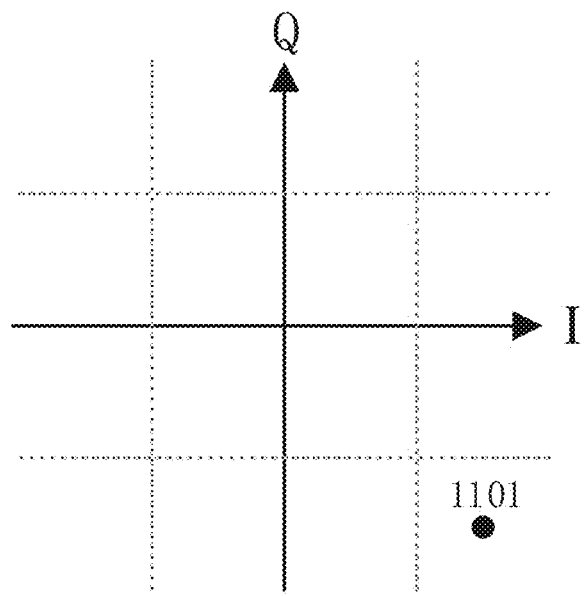
FIG. 3 is a schematic diagram illustrating an X-axis signal of a Gray mapping based on a 16 AQM signal.
Figure 4:
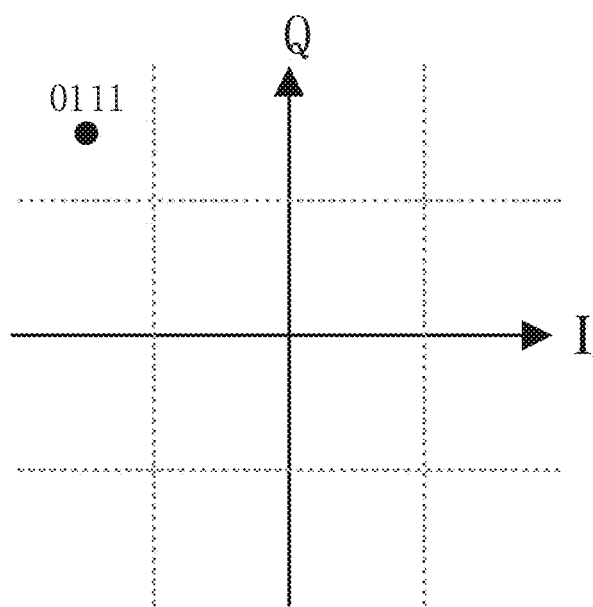
FIG. 4 is a schematic diagram illustrating an Y-axis signal of a Gray mapping based on a 16 AQM signal.
Figure 11:
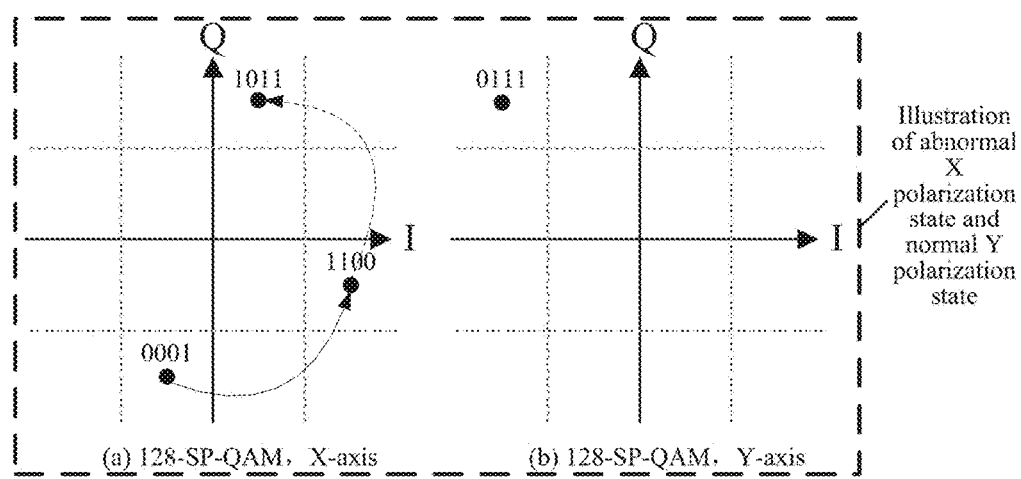
FIG. 11 is a schematic diagram illustrating an abnormal condition of an X polarization state of the 128-SP-QAM signal.

Taking 128-SP-QAM as an example, an even parity is employed. As shown in FIG. 3 and FIG. 4, when signals X and Y received by a reception terminal are 1101 and 0111 respectively, the check bits are normal. As shown in FIG. 11, when 1100 and 0111 are received, the check bits are abnormal. There are two possible reasons. One possible reason is that the abnormal check bits are caused by decision error, what a transmission terminal actually transmitted is 1101, it can be corrected by a next-nearest decision. The other possible reason is that the actual signal is 0001 0111 since the phase ambiguity of the X polarization state is $\pi/2$. If the next-nearest decision is determined to be 1101 0111 according to decision error, two error codes are generated, and the error codes are doubled after the differential decoding is performed.

If with respect to the 128-SP-QAM system using phase difference, when the baud rate is below 30 Gb/s and the Optical Signal Noise Ratio (OSNR) is 23 dB, if the differential decoding is completed before the check and correction of the SP-QAM, the parity error problem caused by phase ambiguity in the system can also be avoided, but the performance is poor and the Bit Error Rate (BER) after checking is about 3e-4. If the differential decoding is placed after the check and correction, the phase ambiguity causes check misjudgment consecutive error code, and the error code is about 0.2. If the differential decoding is placed after the check and correction and the method of embodiments of the present disclosure is used, the performance is greatly improved and the error code is close to zero.

Taking 64-SP-QAM as an example, 64-SP-QAM is generated based on PM-16QAM, the last bit of the X polarization state and the last bit of the Y polarization state are check bits. The 64-SP-QAM may have a phase change of $+/-\pi/2$ in the X polarization state and/or the Y polarization, so both polarization states need to be judged to determine whether a phase change occurs and be corrected. When the baud rate is 30 Gb/s, the error code is 0.24 when one polarization state has a phase change of $+/-\pi/2$, and the error code is 0.5 when both polarization states have the phase change of $+/-\pi/2$. The error code is close to zero after being corrected according to the method of embodiments of the present disclosure. It can be seen that if one polarization state has a phase change of $+/-\pi/2$, the signal of the polarization state contains error; if both polarization states have problems, then both contain error.

When 32-SP-QAM is achieved based on PM-8QAM, the last one on the Y polarization state serves as the check bit, that is, one bit of 6 bits serves as the check bit, the correction method thereof is substantially the same as that of the 128-SP-QAM.

When 32-SP-QAM is achieved based on PM-16QAM, its generation method is as follow. The last bit of the X polarization state serves as the check bit of the X polarization state. The first two bits of the Y polarization state are information, the third bit serves as the check bit of the Y polarization state, and the last bit of the Y polarization state serves as an entirety check bit. The correction method thereof is substantially the same as that of the 64-SP-QAM, and it is necessary to correct X and Y respectively.

Figure 12:
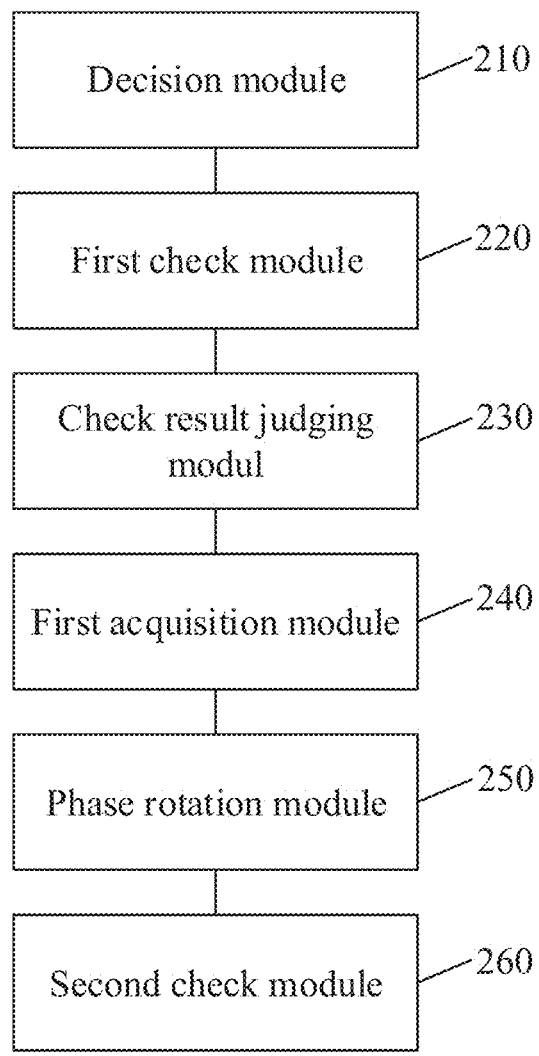
FIG. 12 is a schematic diagram illustrating modules of the phase ambiguity processing device of an embodiment of the present disclosure.

As shown in FIG. 12, an embodiment of the present disclosure further provides a phase ambiguity processing device for a quadrature amplitude modulation signal, which includes the following modules.

A decision module 210 is configured to decide symbols on a Y polarization state and an X polarization state of a received signal, and map to obtain first bit information. The received signal comprises a plurality of first signals.

A first check module 220 is configured to check and analyze the first bit information to generate a first check result.

A check result judging module 230 is configured to judge the first check result to obtain a judgment result as to whether the received signal has phase ambiguity.

A first acquisition module 240 is configured to acquire at least one of the plurality of first signals in the received signal, when the judgment result indicates that the received signal has phase ambiguity.

A phase rotation module 250 is configured to carry out phase rotation on the first signal to obtain a second signal.

A second check module 260 is configured to check and analyze the second signal, store the second signal so that the first signal is replaced with the second signal for decoding processing if a check result is normal.

Optionally, the first check module 220 includes:

A bit acquisition unit, configured to acquire signal bits and a check bit in the first bit information corresponding to each first signal;

A processing unit, configured to perform an exclusive-OR process on the signal bits to obtain a first process result;

A comparison unit, configured to compare the first process result with the check bit to obtain a comparison result;

When the first process result is consistent with the check bit, it is indicated that the comparison result of the first signal is normal; when the first process result is not consistent with the check bit, it is indicated that the comparison result of the first signal is abnormal.

Comparison results of the plurality of first signals together constitute the first check result.

Optionally, the check result judging module 230 is configured to judge the first check result by means of a first implementation manner to obtain the judgment result as to whether the received signal has phase ambiguity:

A state of each first signal in the first check result is analyzed to determine whether the first signal is in a check exception state.

It is indicated that the received signal has phase ambiguity if the number of first signals, to which consecutive check exception occurred, in the first check result exceeds a first predetermined value.

With respect to the first implementation, the first acquisition module 240 is configured to, when the judgment result indicates that the received signal has phase ambiguity, acquire an initial one of the first signals, to which consecutive check exception occurred, and all the first signals after the initial one of the first signals.

Optionally, the check result judging module 230 is configured to judge the first check result by means of a second implementation manner to obtain the judgment result as to whether the received signal has phase ambiguity:

The state of each first signal in the first check result is analyzed to determine whether the first signal is in the check exception state.

If the total number of first signals which are in the check exception state in the first check result exceeds a second predetermined value, it is indicated that the received signal has phase ambiguity.

With respect to the second implementation, the first acquisition module 240 is configured to, when the judgment result indicates that the received signal has phase ambiguity, acquire all the first signals in the received signal.

Optionally, the phase rotation module 250 is configured to:

perform phase rotation on symbols on the X polarization state or the Y polarization state of the first signal to obtain the second signal.

A phase change is $\pi/2$ or $-\pi/2$ by comparing the second signal with the first signal.

Optionally, the second check module includes:

a decision unit, configured to decide symbols in the second signal and map to obtain second bit information;

a checking unit, configured to check and analyze the second bit information and generate a second check result; and a storage unit, configured to store the second signal so that the first signal is replaced with the second signal for decoding process, when the second check result indicates that no exception occurred in checking of the second signal.

Optionally, the second check module 260 further includes:

A next-nearest re-decision unit, configured to, when the second check result indicates that an exception occurred in checking of the second signal, re-decide the second signal by a next-nearest distance to obtain a third signal and store the third signal such that the second signal is replaced with the third signal for decoding process.

Optionally, the phase ambiguity processing device further includes:

A first storage module, configured to, when the judgement result indicates that the received signal does not have phase ambiguity, store the first signal with no check exception in the received signal. The first signal with no check exception in the received signal is used for decoding process.

A decision storage module, configured to re-decide the first signal with check exception in the received signal by a next-nearest distance to obtain a fourth signal and store the fourth signal, such that the first signal is replaced with the fourth signal for decoding process.

It should be noted that the advantages of the implementations of the present disclosure lie in reducing the required additional overhead compared with the training sequence method and improving the system performance compared with the method in which the solving of difference is before checking.

Those ordinarily skilled in the art can understand that all or some of steps of the abovementioned method may be completed by the programs instructing the relevant hardware (for example, a processor), and the programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present disclosure is not limited to any specific form of hardware and software combinations.

The above description is only some embodiments of the present disclosure. It should be noted that those skilled in the art can make various appropriate changes and modifications without departing the principles of the present disclosure, and these changes and modifications should be included within the protection scope of the present disclosure.

INDUSTRIAL APPLICABILITY

The above technical solutions effectively reduce the error rate of the differential decoding of the QAM signal, reduce the system overhead and improve the system performance.

What is claimed is:

1. A phase ambiguity processing method for a quadrature amplitude modulation signal, comprising:
    deciding symbols on a Y polarization state and an X polarization state of a received signal, and mapping to obtain first bit information, wherein the received signal comprises a plurality of first signals;
    checking and analyzing the first bit information to generate a first check result;
    judging the first check result to obtain a judgment result as to whether the received signal includes phase ambiguity;
    acquiring at least one of the plurality of first signals in the received signal in response to determining that the received signal includes phase ambiguity;
    performing phase rotation on the first signal to obtain a second signal; and
    checking and analyzing the second signal and storing the second signal such that the first signal is replaced with the second signal for decoding processing in response to determining that a check result is normal.

2. The phase ambiguity processing method according to claim 1, wherein checking and analyzing the first bit information to generate the first check result comprises:
    acquiring signal bits and a check bit in the first bit information corresponding to each of the plurality of first signals;
    performing an exclusive-OR process to the signal bits to obtain a first process result; and
    comparing the first process result with the check bit to obtain a comparison result,
    wherein, the comparison result of the first signal is normal when the first process result is consistent with the check bit; and the comparison result of the first signal is abnormal when the first process result is not consistent with the check bit, and
    comparison results of the plurality of first signals together constitute the first check result.

3. The phase ambiguity processing method according to claim 2, wherein performing phase rotation on the first signal to obtain a second signal comprises:
    performing phase rotation on symbols on the X polarization state or the Y polarization state of the first signal to obtain the second signal,
    wherein, a phase change is $\pi/2$ or $-\pi/2$ by comparing the second signal with the first signal.

4. The phase ambiguity processing method according to claim 1, wherein judging the first check result to obtain a judgment result as to whether the received signal includes phase ambiguity comprises:
    analyzing a state of each first signal in the first check result and determining whether the first signal is in a check exception state,
    wherein, the received signal includes phase ambiguity if a number of first signals, to which consecutive check exception occurred, in the first check result exceeds a first predetermined value; and
    wherein acquiring at least one of the plurality of first signals in the received signal when the judgment result indicates that the received signal includes phase ambiguity comprises:
        acquiring an initial one of the first signals, to which consecutive check exception occurred, and all first signals after the initial first signal when the judgment result indicates that the received signal includes phase ambiguity.

5. The phase ambiguity processing method according to claim 4, wherein performing phase rotation on the first signal to obtain a second signal comprises:
    performing phase rotation on symbols on the X polarization state or the Y polarization state of the first signal to obtain the second signal,
    wherein, a phase change is $\pi/2$ or $-\pi/2$ by comparing the second signal with the first signal.

6. The phase ambiguity processing method according to claim 1, wherein judging the first check result to obtain a judgment result as to whether the received signal includes phase ambiguity comprises:
    analyzing a state of each first signal in the first check result to determine whether the first signal is in a check exception state;
    wherein the received signal includes phase ambiguity if a total number of first signals which are in the check exception state in the first check result exceeds a second predetermined value; and
    wherein acquiring at least one of the plurality of first signals in the received signal when the judgment result indicates that the received signal includes phase ambiguity comprises:
        acquiring all first signals in the received signal when the judgment result indicates that the received signal includes phase ambiguity.

7. The phase ambiguity processing method according to claim 6, wherein performing phase rotation on the first signal to obtain a second signal comprises:
    performing phase rotation on symbols on the X polarization state or the Y polarization state of the first signal to obtain the second signal,
    wherein, a phase change is $\pi/2$ or $-\pi/2$ by comparing the second signal with the first signal.

8. The phase ambiguity processing method according to claim 1, wherein performing phase rotation on the first signal to obtain a second signal comprises:
    performing phase rotation on symbols on the X polarization state or the Y polarization state of the first signal to obtain the second signal,
    wherein, a phase change is $\pi/2$ or $-\pi/2$ by comparing the second signal with the first signal.

9. The phase ambiguity processing method according to claim 1, wherein checking and analyzing the second signal and storing the second signal such that the first signal is replaced with the second signal for decoding processing in response to determining that the check result is normal comprises:
    deciding symbols in the second signal, and mapping to obtain second bit information;

checking and analyzing the second bit information to generate a second check result; and storing the second signal such that the first signal is replaced with the second signal for decoding process in response to determining that the second check result indicates that no exception occurred in checking of the second signal.

10. The phase ambiguity processing method according to claim 9, further comprising:

re-deciding the second signal by a next-nearest distance to obtain a third signal in response to determining that the second check result indicates that an exception occurred in checking of the second signal, and storing the third signal such that the second signal is replaced with the third signal for decoding process.

11. The phase ambiguity processing method according to claim 1, further comprising:

storing the first signals with no check exception in the received signal and using the first signals with no check exception in the received signal in decoding process in response to determining that the judgement result indicates that the received signal includes no phase ambiguity; and re-deciding the first signals with check exception in the received signal by a next-nearest distance to obtain a fourth signal, storing the fourth signal such that the first signal is replaced with the fourth signal for decoding process.

12. A phase ambiguity processing device for a quadrature amplitude modulation signal, comprising a processor configured to:

decide symbols on a Y polarization state and an X polarization state of a received signal, and map to obtain first bit information, wherein the received signal comprises a plurality of first signals;

check and analyze the first bit information to generate a first check result;

judge the first check result to obtain a judgment result as to whether the received signal includes phase ambiguity;

acquire at least one of the plurality of first signals in the received signal in response to determining that the received signal includes phase ambiguity;

perform phase rotation on the first signal to obtain a second signal; and check and analyze the second signal and store the second signal such that the first signal is replaced with the second signal for decoding processing in response to determining that a check result is normal.

13. The phase ambiguity processing device according to claim 12, wherein the processor is further configured to:

analyze a state of each first signal in the first check result to determine whether the first signal is in a check exception state, wherein the received signal includes phase ambiguity if a number of first signals, to which consecutive check exception occurred, in the first check result exceeds a first predetermined value;

the processor further configured to:

acquire an initial one of first signals, to which consecutive check exception occurred, and all the first signals after the initial one of the first signals when the judgement result indicates that the received signal includes phase ambiguity.

14. The phase ambiguity processing device according to claim 13, wherein the processor is further configured to:

perform phase rotation on symbols on the X polarization state or the Y polarization state of the first signal to obtain the second signal, wherein a phase change is π/2 or −π/2 by comparing the second signal with the first signal.

15. The phase ambiguity processing device according to claim 12, wherein the processor is configured to:

analyze a state of each first signal in the first check result to determine whether the first signal is in a check exception state;

wherein the received signal includes phase ambiguity if a total number of first signals which are in the check exception state in the first check result exceeds a second predetermined value;

the processor is further configured to:

acquire all the first signals in the received signal when the judgement result indicates that the received signal includes phase ambiguity.

16. The phase ambiguity processing device according to claim 15, wherein the processor is further configured to:

perform phase rotation on symbols on the X polarization state or the Y polarization state of the first signal to obtain the second signal, wherein a phase change is π/2 or −π/2 by comparing the second signal with the first signal.

17. The phase ambiguity processing device according to claim 12, wherein the processor is configured to:

perform phase rotation on symbols on the X polarization state or the Y polarization state of the first signal to obtain the second signal, wherein a phase change is π/2 or −π/2 by comparing the second signal with the first signal.

18. The phase ambiguity processing device according to claim 12, wherein the processor is further configured to:

decide symbols in the second signal, and map to obtain second bit information;

check and analyze the second bit information to generate a second check result; and store the second signal such that the first signal is replaced with the second signal for decoding process in response to determining that the second check result indicates that no exception occurred in checking of the second signal.

19. A non-transitory computer storage medium storing computer-executable instructions that, when executed by a processor, cause the processor to perform the following method, comprising:

deciding symbols on a Y polarization state and an X polarization state of a received signal, and mapping to obtain first bit information, wherein the received signal comprises a plurality of first signals;

checking and analyzing the first bit information to generate a first check result;

judging the first check result to obtain a judgment result as to whether the received signal includes phase ambiguity;

acquiring at least one of the plurality of first signals in the received signal in response to determining that the received signal includes phase ambiguity;

performing phase rotation on the first signal to obtain a second signal; and checking and analyzing the second signal and storing the second signal such that the first signal is replaced with the second signal for decoding processing in response to determining that the check result is normal.

20. The non-transitory computer storage medium according to claim 19, wherein checking and analyzing the first bit information to generate the first check result comprises:
   acquiring signal bits and a check bit in the first bit information corresponding to each of the plurality of first signals;
   performing an exclusive-OR process to the signal bits to obtain a first process result;
   comparing the first process result with the check bit to obtain a comparison result,
   wherein, the comparison result of the first signal is normal when the first process result is consistent with the check bit; and the comparison result of the first signal is abnormal when the first process result is not consistent with the check bit, and
   comparison results of the plurality of first signals together constitute the first check result.

* * * * *

UNITED STATES PATENT AND TRADEMARK OFFICE
CERTIFICATE OF CORRECTION

PATENT NO. : 10,218,557 B2
APPLICATION NO. : 15/574457
DATED : February 26, 2019
INVENTOR(S) : Aimei Fei It is certified that error appears in the above-identified patent and that said Letters Patent is hereby corrected as shown below:

On the Title Page

On page 2, in Column 2, (Item (56)), at Line 35, Under Other Publications, after "Tracking" insert *--for--*.

In the Drawings

On Sheet 10 of 10 (Reference Numeral 230) (FIG. 12) at Line 2, change "*modul*" to *--module--*.

In the Specification

In Column 2 at Line 12, change "*reduced.*" to *--reduced,--*.

In Column 5 at Line 23, change "*AQM*" to *--QAM--*.

In Column 5 at Line 25, change "*AQM*" to *--QAM--*.

In Column 5 at Line 27, change "*AQM*" to *--QAM--*.

In Column 7 at Line 11, change "*16 QAm*" to *--16QAM--*.

Signed and Sealed this
Eighth Day of October, 2019

Andrei Iancu
*Director of the United States Patent and Trademark Office*